May 26, 1970  A. L. DE GRAFFENRIED  3,514,612
ASTRONOMICAL SEEING CONDITIONS MONITOR
Filed Aug. 23, 1967  4 Sheets-Sheet 4

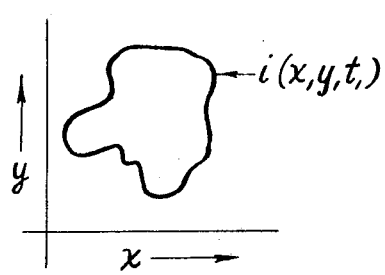
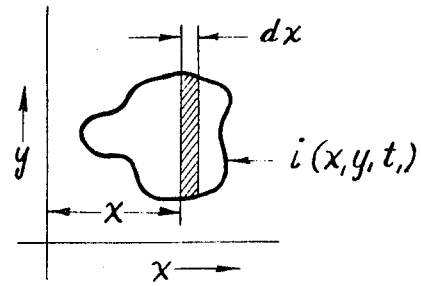
FIG. 1          FIG. 2
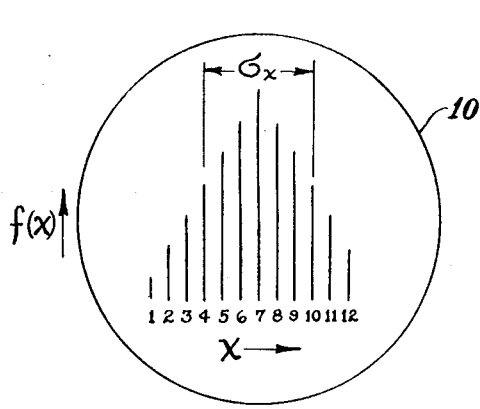
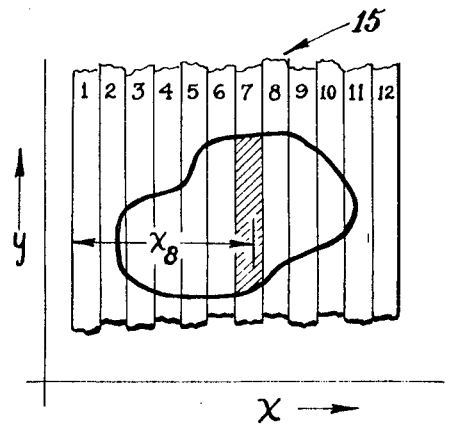
FIG. 3          FIG. 4
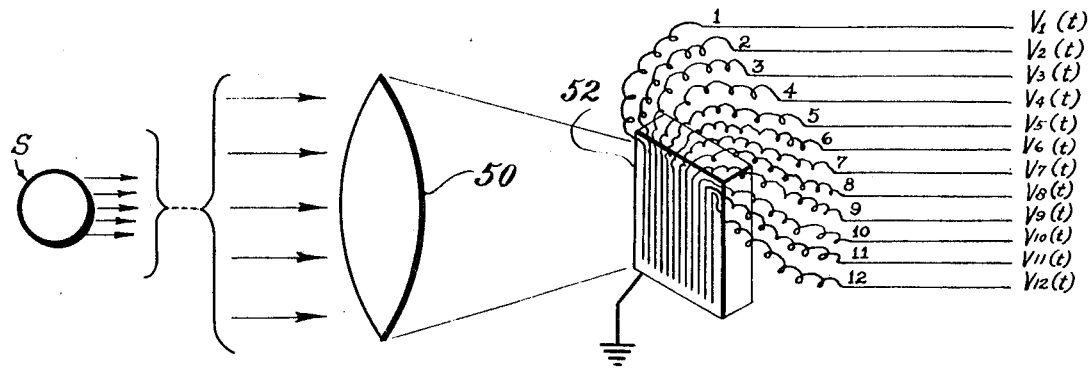
FIG. 5
INVENTOR.
ALBERT L. DE GRAFFENRIED
BY
*Leonard H. King*
ATTORNEY

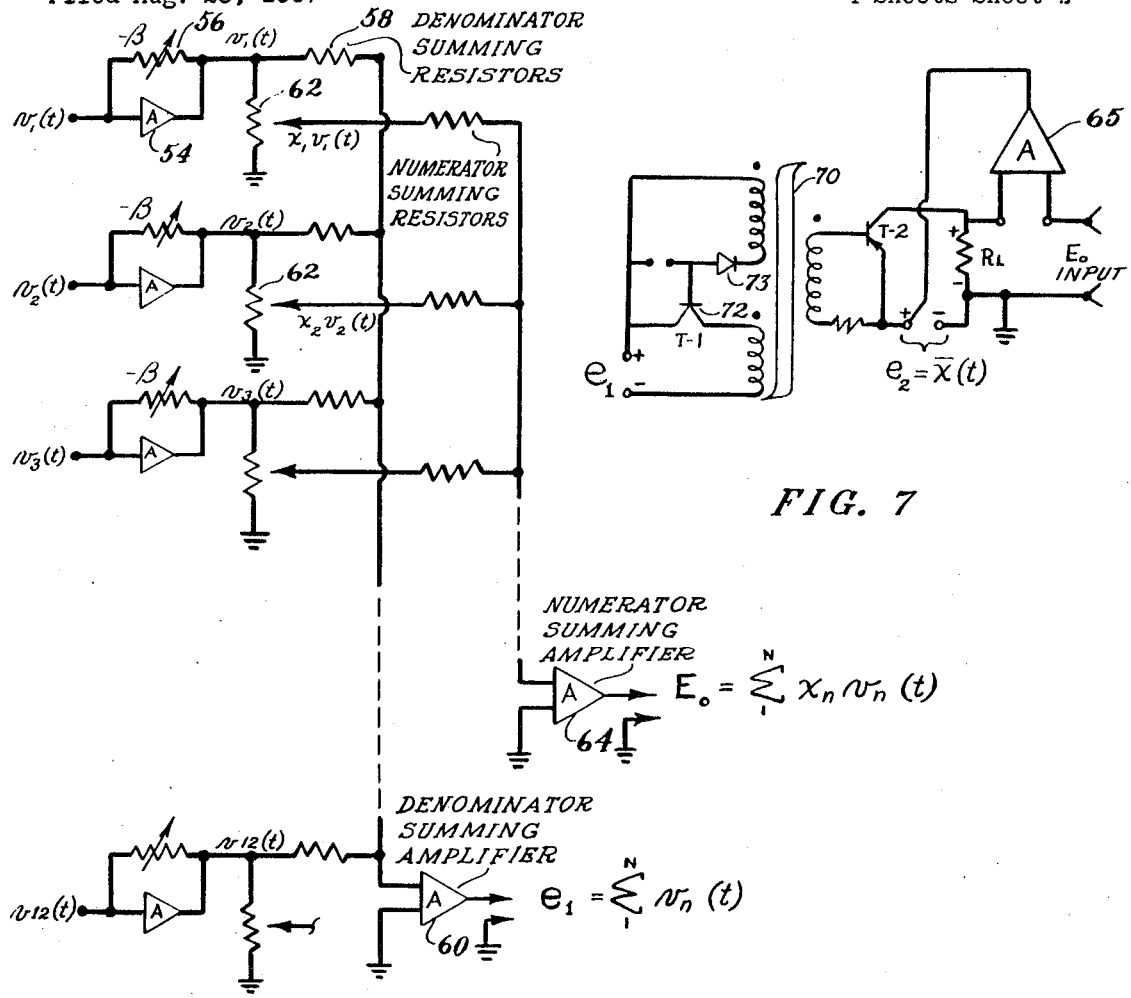
FIG. 7
FIG. 6
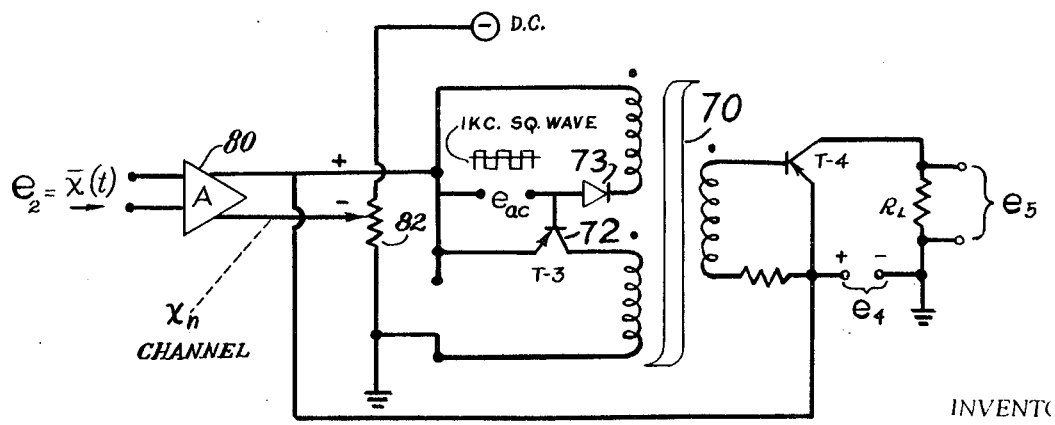
FIG. 8

INVENTOR.
ALBERT L. DE GRAFFENRIED
BY
Leonard H. King
ATTORNEY

United States Patent Office 3,514,612
Patented May 26, 1970

3,514,612
ASTRONOMICAL SEEING CONDITIONS MONITOR
Albert L. de Graffenried, 30 Washington Ave.,
Glen Head, N.Y. 11545
Filed Aug. 23, 1967, Ser. No. 662,708
Int. Cl. G01n 21/26
U.S. Cl. 250—218                         6 Claims

ABSTRACT OF THE DISCLOSURE

Apparatus for measuring the effect of perturbations of a medium on a beam of energy propagated therethrough, by measuring the center-of-gravity of image intensity as a function of time.

This invention relates to an apparatus for measuring the degre of modulation of a beam of energy during propagation through a medium and in particular, to such apparatus employed in "seeing conditions" monitors and to methods for measuring seeing conditions.

BACKGROUND OF INVENTION (A) When energy travels through a homogeneous medium, it travels in a straight line. However, if the medium is non-homogeneous or, if its properties vary with both space and time, then any beam of energy traveling therethrough will be broadened or scattered in some fashion. Important examples are:

(1) starlight traveling downward through the earth's atmosphere, or
(2) sound waves or a laser beam traveling through the ocean.

To an astronomer, the perturbations of the atmosphere are important, for their scattering limits the resolution or detail of his vision and blurs his telescopic photographs of the planets. Astronomers have long been seeking reliable means for direct and continuous measurement of astronomical "seeing conditions."

(B) Early means for measuring astronomical seeing conditions consisted simply of looking through the telescope at several selected objects such as the closed-spaced rings surrounding Saturn, or any one of several double stars. The closer the angular spacing one could resolve, the better the seeing conditions. However, this technique for measuring astronomical seeing conditions required the astronomer to spend much of his valuable time just looking into the telescope to see if seeing conditions were good. Also, the measurement lacked accuracy.

With the arrival of the vacuum tube and photoelectric cell, astronomers began to experiment with various means for measuring seeing conditions. An excellent treatment of some of the concepts and their limitations is available in the publication, "Optical Scintillation; a Survey of the Literature" Technical Note #225 by Jurgen Meyer-Arendt and C. B. Emmanuel, U.S. Department of Commerce, National Bureau of Standards, U.S. Government Printing Office, Washington, D.C. 20402. Chapter 3, titled "Random Refraction" (particularly section 18 thereunder titled "Newer Experimental Methods") presents an excellent survey of the recent techniques, and refers to such patents as U.S. Pat. No. 2,513,367 granted to L. B. Scott and U.S. Patent No. 2,977,847 granted to J. Meyer-Arendt. Unfortunately, none of these methods succeeds in fulfilling the stronomer's needs. The references fail to:

(1) Define, in rigorous analytical terms, the physical meaning of "seeing conditions"; and
(2) Present to the astronomer a continuous automatic measurement of the fundamental variables which describe "astronomical seeing conditions."

The apparatus of my invention overcomes the deficiencies of the prior art by sensing certain parameters which I have found to be indicative of "seeing conditions." In brief, energy in the mediums (e.g., light, sound, electromagnetic radiation, etc.) is focused on an arry of discrete sensing means, the moment related parameters of the distribution of the energy on the discrete members are computed and read.

The essential parameters are:

(A) The position of the center-of-gravity of image intensity as a function of time; and (B) The magnitude of the variance of image intensity as a function of time.

These two quantities represent image motion and image distribution (sometimes called "image distortion") respectively, and act as "signatures" which help to identify the nature of the perturbation.

Accordingly, it is an object of this invention to provide a method of measuring seeing conditions of a propagating medium.

It is an object to provide an apparatus for measuring seeing conditions.

Still a further object is to provide a method for improving observatory sites.

A still further object is to provide an apparatus for quantative measurement of seeing conditions.

A particular object of the invention is to provide means for detection of heat turbulence and/or wave-producing bodies submerged in water.

Still a different object of this invention is to provide means for detecting clear air turbulence.

Another object is to provide a laser beam detector for perturbations of a medium.

These and other objects, features and advantages of the invention will, in part, be pointed out with particularity and will, in part, become obvious from the following more detailed description of the invention taken in conjunction with the accompanying drawing which forms an integral part thereof.

BRIEF DESCRIPTION OF THE DRAWING

FIG. 1 is a typical plot of the image of a distant star focused onto the image plane of a telescope;

FIG. 2 shows graphically the dissection of the image of FIG. 1 into segments for integration by calculus;

FIG. 3 is a pictorial showing of a cathode ray tube showing the display of the angular distribution of received starlight of width sigma sub-$x$.

FIG. 4 shows in plan the image plane of a telescope with a plurality of discrete photodetectors;

FIG. 5 is a pictorial representation of a double convex lens focusing rays of light from a star onto an array of photodetectors;

FIG. 6 is a circuit diagram of a pair of summing circuits;

FIG. 7 is a circuit diagram of a divider;

FIG. 8 is a circuit diagram of a simplified version of the circuit of FIG. 7 used for squaring;

Figure 9:
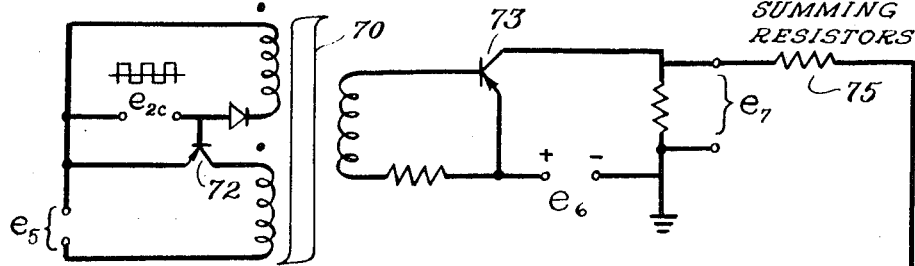
FIG. 9 is a multiplying circuit diagram.

The invention will now be described with relation to its application to seeing conditions of the atmosphere using the light from a star as an example of a source of light. The distance of a star from the earth is so great that such a source may be considered a point source and its rays may be considered parallel at their plane of entry into the earth's atmosphere. The word "parallel" means that all the small bundles of rays which make up the received beam of starlight are aligned with a straight line drawn from the source to the observer. Phrased another way, the angular-distribution function of these bundles of rays, which we will call $f(\alpha)$, has essentially zero width. If the index-of-refraction of the earth's atmosphere varied with space but not with time, then $f(\alpha)$ would have a finite width and a particular shape. But it is a fact that the index-of-refraction of the earth's atmosphere varies with time as well as with space and this dual variation causes $f(\alpha)$ to fluctuate timewise in both shape and width. If, at any instant, $t_1$, we examine the image of a star focused on the image plane of a telescope, we will see a pattern resembling FIG. 1. If the earth had no atmosphere, the image would be a tiny spot surrounded by rings, that is, the normal diffraction pattern of the telescope aperture. However, the atmosphere bends some of the light rays and as a result spreads the light over the image plane in a random intensity pattern $i(x, y, t_1)$. It is clear, then, that the spread of the image can be related to the angular distribution function $f(\alpha)$ of the light incident upon the telescope aperture. Based on this relationship we can now define three terms used to describe seeing conditions, namely, Image Motion, Image Distortion and Scintillation, as follows:

(A) Image Motion is the motion of the centroid of the intensity distribution, $i(x, y, t)$ about the image plane.

(B) Image Distortion is determined by the variance of the intensity distribution $i(x, y, t)$.

(C) Scintillation is determined by the time variation (intensity modulation) of the total light flux at the image plane.

FIG. 2 is used to write the equation for the centroid or center of gravity $\bar{x}$ of $i(x, y, t_1)$. It is by calculus:

$$\bar{x}(t) = \frac{\int_{-\infty}^{\infty} \int_{0}^{\infty} x \cdot i(x, y, t) \, dx \, dy}{\int_{-\infty}^{+\infty} \int_{0}^{\infty} i(x, y, t) \, dx \, dy}$$

being the first moment of the intensity of all strips $y\Delta x$ divided by the total flux incident on the image plane.

Using the centroid $\bar{x}(t)$ we can now write the equation for the variance of the intensity distribution, $\sigma_x(t)$, as follows:

$$\sigma_x(t) = \left[\frac{\int_{-\infty}^{+\infty} \int_{0}^{-\infty} [\bar{x}(t) - x]^2 \cdot i(x, y, t) \, dx \, dy}{\int_{-\infty}^{+\infty} \int_{0}^{\infty} i(x, y, t) \, dx \, dy}\right]^{1/2}$$

It is the second moment of the intensity of all strips ($y \cdot \Delta x$) divided by the total flux incident on the image plane all to the ½ power.

Scintillation is the following:

$$I(t) = \int_{-\infty}^{+\infty} \int_{0}^{\infty} i(x, y, t) \, dx \, dy$$

It is fundamental and therefore noteworthy that the denominator of both the $\bar{x}$ and $\sigma(t)$ equations is $I(t)$, the scintillation. The presence of $I(t)$ in the denominator assures that any time variation of $\bar{x}$ or $\sigma_x$ will be due solely to changes in the spatial distribution of $i$ over the $xy$ plane and that none will be caused by scintillation. It is further noteworthy that $\bar{x}$, defined in the first equation is included in the second equation, indicating that the concept of image distortion is distinct from but directly dependent upon a rigorous definition of image motion. Now that all three seeing conditions terms have been described and defined, we may list the objects and advantages of my invention.

As has been stated, one object of my invention is to provide the astronomer with a rational means for automatically measuring what has heretofore been called "seeing conditions." My invention senses and computes, then displays numerical values for $\bar{x}(t)$, $\sigma_x(t)$, and $I(t)$. My invention can also display periodically the time-averaged intensity distribution $f(x)$ which is a close approximation of $f(\alpha_x)$, the angular distribution function, considering the bending of rays along the $x$ direction only. Such a display is shown in FIG. 3 as a cathode-ray tube 10 display. With such quantization and displays available, the astronomer may be well served. For example, if he wishes to take high-resolution photographs of the moon, he may set selector switches on his Seeing Conditions Monitor for specific conditions, such as:

Max. displacement: $\bar{x}(t) < 2.5$ seconds of arc
Max. velocity: $\dot{\bar{x}}(t) < 10$ seconds of arc/second of time
Max. variance: $\sigma_x(t) < 3$ seconds of arc while his telescope tracks some bright star near the moon. When his selected conditions are fulfilled, he may then take photographs with some assurance that they will turn out well.

Another object of my invention is to provide a numerical basis for the selection and/or improvement of astronomical observatory sites. Recent theory and measurements indicate that some improvement in low-altitude seeing conditions may be realized by careful modification of the terrain adjacent an observatory. With my invention, as astronomer may now determine quantitatively the effect of terrain modification upon seeing conditions at his observatory site, for a given set of meteorological conditions. In other words, my invention, an Astronomical Seeing Conditions Monitor (ASCM), will do two things for the astronomer:

(A) It will help him to improve the average seeing conditions at his observatory; and (B) It will automatically monitor the (improved) seeing conditions to find the time-of-occurrence of the very best seeing conditions.

Moving now from the atmosphere into the ocean, and using a laser, my invention will be useful for determining remotely the angular distribution function $f(\alpha)$ for large and small scale turbulence and temperature variations of the ocean. Such information is helpful in obtaining a better understanding of the ocean currents, convection cells, and life patterns in the ocean. Since ocean vessels generate heat, turbulence, convection, and wave patterns when they move, my invention should prove useful in the search, detection, localizing, and even identification of such vessels.

Therefore because my invention is capable of quantizing remotely the index-of-refraction perturbations in terms of the angular distribution function $f(\alpha)$, it is useful for remote study of the disturbance patterns in any medium, either fluid or solid.

FIG. 4 shows again the image plane of a telescope with long narrow strips 15 thereon. These strips may be solid-state photo-detectors, or they may be the bundle-ends of a group of "light pipes" which lead to 12 photomultiplier tubes. In either case, the strips shown are parallel to the $y$-axis. Each strip is located at a certain distance $x_n$ from the $y$-axis, i.e., strip 8 is located a distance $x_8$ from the $y$-axis. The strips are sufficiently long that no part of the image extends beyond them. It is to be understood that the 12 strips are shown only by way of example. An array may have whatever number of cells will satisfy the resolution requirements of the astronomer involved. The electrical signal generated by each detector is $v_n$ and $v_n$ depends upon the light incident on that cell. The moment of $V_n$ about the y-axis is: $\Delta M(t) = x_n \cdot v_n(t)$ and the sum of the moments of all strips is $$\Sigma M(t) = \sum_1^N x_n \cdot v_n(t)$$

The centroid of $i(x, y, t)$ may be computed approximately by $$\bar{x}(t) = \frac{\sum_1^N M(t)}{\sum_1^N v_n(t)} = \frac{\sum_1^N x_n v_n(t)}{\Sigma v_n(t)}$$

In similar fashion, the variance of $i(x, y, t)$ may be computed approximately from $$\sigma_x(t) = \left[ \frac{\sum_1^N \{[\bar{x}(t) - x_n]^2 v_n(t)\}}{\sum_1^N v_n(t)} \right]^{1/2}$$

It is clear that the array of n strips could, alternately, be oriented parallel to the x-axis, in which case, we would compute $\bar{y}(t)$ and $\sigma_y(t)$. Also, $\bar{x}(t)$ and $\bar{y}(t)$ may be combined vectorially to produce $\bar{r}(t)$ and $\theta(t)$, the polar coordinates of the centroid, where $$\bar{r}(t) = \bar{x}(t)^2 + \bar{y}^2(t) \text{ and } \bar{\theta}(t) = \arctan\left[\frac{\bar{y}(t)}{\bar{x}(t)}\right]$$

Clearly, $\sigma_x(t)$ and $\sigma_y(t)$ may be treated similarly to compute $\sigma_r(t)$ and $\sigma^\theta(t)$. In lieu of the above, the array could be rotated slowly to compute $\bar{r}(\theta, t)$ and $\sigma_r(\theta, t)$.

Finally, for scintillation, we have $$I(t) = \sum_1^N v_n(t)$$

Other higher moments could be used if they appear to contribute anything worthwhile. Too, a TV camera may be substituted for the n-strip array to provide greater information rate, without departing from the spirit of my invention.

FIG. 5 shows a double convex lens 50 focusing the rays of light from star S onto a 12-strip array of photovoltaic detectors 52. The outputs, $v_n(t)$, where: $n = 1, 2, 3, \ldots$ 12 each go to a preamplifier 54 shown in FIG. 6 which is gain-stabilized by negative feedback. The value of the feedback resistor 56 can be adjusted slightly to compensate for variations in photodetector efficiency. The output of each amplifier feeds through a denominator summing resistor 58 to the denominator summing amplifier 60 to provide $e_1$, the scintillation signal.

It will be noted in FIG. 6 that each of the $v_n(t)$ nodes also feeds a potentiometer 62, the wiper of which is set proportional to $x_n$. The output of the potentiometer is $x_n \cdot v_n(t)$ and all 12 of these outputs are summed by a numerator summing amplifier 64 to provide $$E_0 = \sum_1^N x_n v_n(t)$$

the numerator of $\bar{x}(t)$.

The next computation required is division. The circuit used in FIG. 7 for division is a modified form of a basic circuit shown in FIG. 8 which will be used throughout the remainder of this description. The basic circuit of FIG. 8 uses a square-loop magnetic core 70 in conjunction with switching transistors 72, 73. It is a multiplier circuit wherein the magnitude of $e_5$ depends on $e_4$ but the fractional part of each $e_{ac}$ cycle during which $e_4$ is applied to $R_L$ depends directly on $e_3$. Therefore, the time-average voltage at $e_5$ is the product of $e_3$ and $e_4$. For theory and detailed explanation of this basic circuit, see "Transcendental Function Analog Computation with Magnetic Cores," D. H. Schaefer and R. L. Van Allen, Feb. 9, 1956, NRL Report 4681, Naval Research Laboratory, Washington, D.C., and also "Analogue Computation of Quotients and Functions Containing Quotients Using Magnetic Cores" by D. H. Schaefer, Feb. 27, 1956, NRL Report 4702, Naval Research Laboratory, Washington, D.C.

FIG. 7 uses the basic circuit of FIG. 8 plus a nulling amplifier 65 to adjust $e_2$ until the time-averaged voltage across $R_L$ equals $E_0$. Then, since:

$$E_0 = e_1 \cdot e_2$$
$$e_2 = \frac{E_0}{e_1} = \bar{x}(t)$$

FIG. 8 begins the calculation of $\sigma_x$ by calculating $[\bar{x}(t) - x_n]^2$. $\bar{x}(t)$ is brought into a small isolation amplifier and the output voltage is reduced by a voltage proportional to $x_n$ tapped from the $x_n$ potentiometer. The difference signal $[\bar{x}(t) - x_n]$ is fed into a second basic computing circuit at both input positions, thereby producing $[\bar{x}(t) - x_n]^2$ at output $e_5$.

In FIG. 9 this squared quantity $e_5$ is input to another basic multiplier circuit wherein $e_{7_n} = v_n(t)$. The output $e_{7_n} = [\bar{x}(t) - x_n]^2 \cdot v_n(t)$ from each of the $n$ channels is fed through its summing resistor 75 to a summing amplifier 77. The output $$e_8 = \sum_1^N \{[\bar{x}(t) - x_n]^2 \cdot v_n(t)$$

and is the numerator of $\sigma_x(t)$ which must be divided by the scintillation term, $$\sum_1^N v_n(t)$$

For division, the circuit of FIG. 7 is used again, producing $e_9 = e_{8/e_1}$. The remaining computation is a square root of $e_9$. Here again the basic multiplication circuit is used, but with two variations:

(1) The $e_{ac}$ is changed from square-wave to linear rise ($kt$) wave shape; and (2) The righthand input voltage is held constant. The result is $e_{10} = \sqrt{e_9} = \sigma_x(t)$.

FIG. 3 illustrates a vertical bar graph showing the time-averaged distribution of intensity in the $x$ direction, namely $f(x)$. Since $f(x)$ is closely dependent on $f(\alpha)$, this display is valuable to the astronomer in forming a mental picture of seeing conditions.

Figure 10:
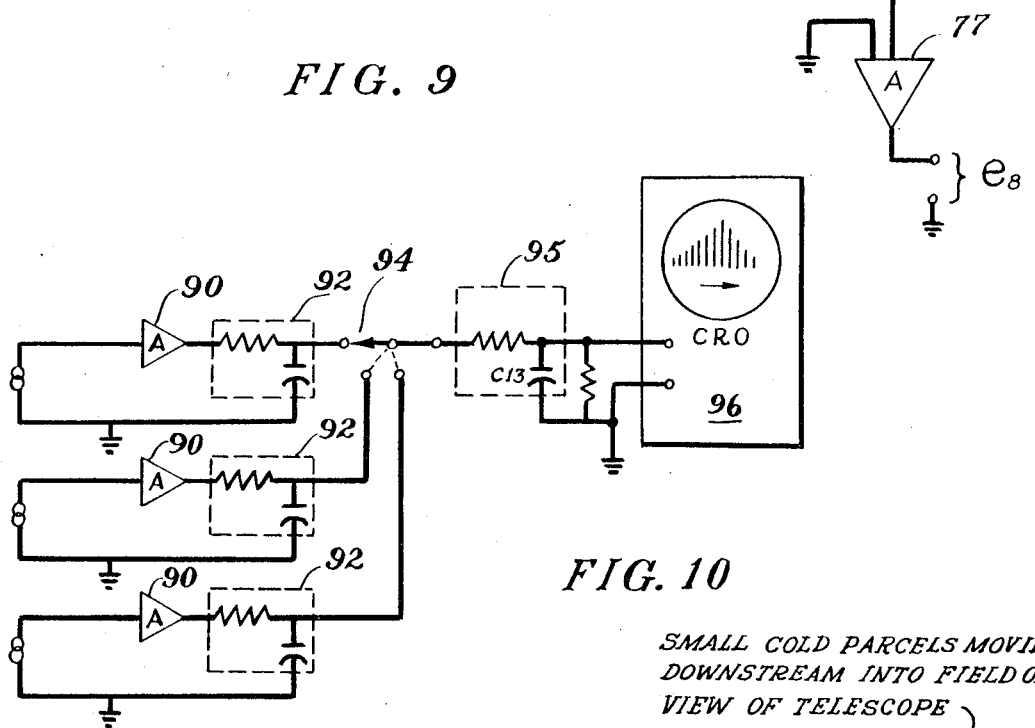
FIG. 10 is a circuit diagram for displaying angular distribution of received starlight.
Figure 11:
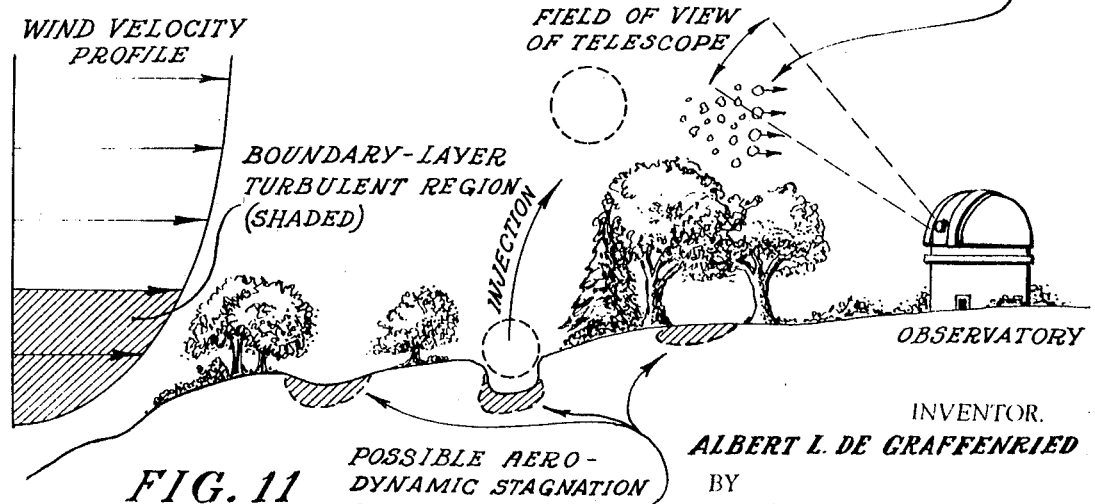
FIG. 11 is a pictorial showing of a typical observatory site showing terrain characteristics capable of introducing perturbations into the atmosphere.

FIG. 10 illustrates a simplified system for generating such a display. On the left, $v_1(t)$ is amplified by amplifiers 90 and time-averaged by RC network 92. Commutator 94 moves vertically downward, sampling the $v_n$ voltages. RC network 95 slows down the rate-of-rise of the voltage reaching the vertical axis terminals of the cathode ray oscilloscope 96 (CRO) so that the display resembles a bar graph rather than just a series of dots at the peaks of the display. The horizontal sweep of the CRO and the commutator are synchronized.

All of the circuits described above are called out with simplicity and reliability as prime considerations. However, if accuracy or wider bandwidth are more important, then there are well known high-speed digital techniques which may be substituted without departing from the spirit of this part of my invention.

Now I will describe an important application of my invention which is also an object of my invention. Recent meteorological measurements at Kitt Peak National Observatory, Tucson, Ariz., using very sensitive air-temperature probes, have revealed that index-of-refraction perturbations in the lower atmosphere frequently occur as clusters of small air parcels which differ slightly in temperature from the air mass in which they are embedded. As the air mass moves, these parcels are transported through the field of view of the observatory telescope and cause image motion and image distortion. The source or birthplace of such small parcels is generally at an aerodynamic stagnation region located upwind of the observatory. Now, it is usually the case that an air mass differs in temperature from the surface of the terrain over which it is passing. There is therefore heat flow occurring, from the air mass to the terrain or vice versa, and this heat flow is usually a turbulent-transfer process. However, a clump of bushes, a ravine, or a grove of trees can provide an aerodynamic stagnation region, and within this region the normal heat-transfer rate (between air mass and soil) is much reduced. If, for example, the air mass is warmer than the surface soil, then any large parcel of air trapped within a stagnation region will be cooled to a temperature lower than that of the overriding air mass. From time to time, however, the turbulence (normally present in the boundary layer of a moving air mass) will "scoop out" this large cold parcel and inject it into the passing air flow. As the large cold parcel is carried downstream toward the observatory, it is shredded or broken up, by turbulence, into numerous small parcels. It is these many small parcels, differing in temperature from the rest of the air mass and passing across the field-of-view of the telescope, which cause image motion and image distortion. Fortunately, however, such stagnation regions, being colder (in this case) than the surrounding terrain, can be located (by an overflying aircraft or from a tall tower) if sensitive infrared detection equipment is used, even though the temperature difference is only ½° Fahrenheit. Once such "cold spots" are located they can be eliminated by terrain modifications, as follows: a ravine may be filled in, a clump of bushes removed, or a grove of trees ventilated by cutting a swath therethrough. However, all such efforts are of little significance unless the astronomers at the related observatory can be shown conclusively that the low altitude seeing conditions have, in fact, been improved. Since this can be done only with a measuring instrument, such as my invention, which clearly and rigorously defines the measurements it makes, the use of an Astronomical Seeing Conditions Monitor and the cooperative use of the Cold Spot theory and earth-temperature sensing means, is a technique for observatory site selection and/or improvement. Since there are many observatories and telescopes in use now which are seeing-conditions-limited rather than diffraction-limited, such a technique will prove very useful in improving our astronomical seeing ability.

This disclosure has used a cold spot for purposes of illustration, but clearly, a warm spot is also applicable. Too. airborne infrared equipment has been cited, but other means for measuring soil temperature either at the surface or below. are equally applicable.

Figure 12:
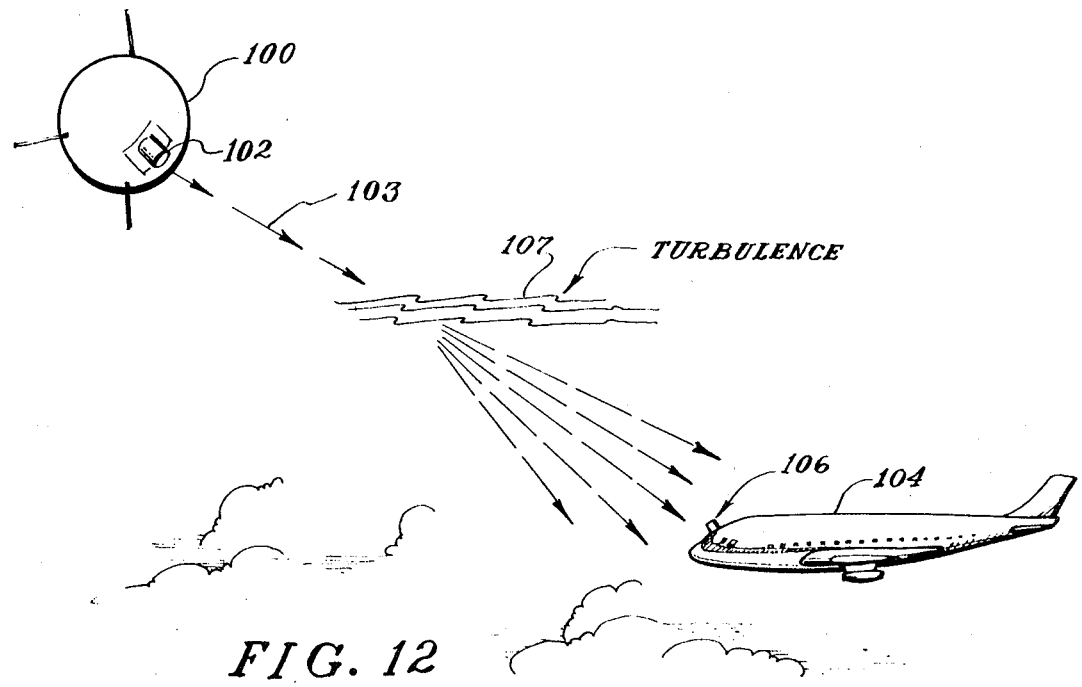
FIG. 12 is a pictorial showing of an aircraft and a satellite.

Clear Air turbulence can be detected by my invention in the following manner (see FIG. 12).

(A) Satellite 100 is a low-altitude orbiting unit carrying a broad beam multicolor CW laser whose beam 103 is always aimed at earth.

(B) Aircraft 104 is equipped with a tracking telescopic receiver 106 and Seeing Conditions Monitor having narrowpass optical filters to receive only the satellite's laser wavelengths.

(C) As the aircraft is climbing up or cruising at altitude, the pilot may lock the monitor on the laser signal of one of the passing satellites and may monitor the seeing conditions between his aircraft and the satellite. Since the satellite can encircle the earth in 90 minutes, it crosses from horizon to horizon rapidly, thereby serving as an Atmospheric Scanner for the relatively slow aircraft.

(D) As the moving line of sight passes through clear-air turbulence 107, the character of the normal atmospheric perturbations being displayed by the monitor changes markedly in some fashion. This change may occur, for example, in the high audio-frequency spectrum of $\bar{x}(t)$ or in the time average of the magnitude of the variance $x(t)$ or by a particular combination thereof.

(E) By monitoring several successive satellites as they pass through his forward quadrant, he will gain a fairly clear picture of the approximate location and extent of clear air turbulence regions. Particularly, when these satellites pass near zero elevation, the pilot can sense what clear air turbulence is ahead at his current altitude.

(F) Clearly, earth-based receiving stations may also engage in such tracking activities, but the probability of sky obscurement by clouds is much greater. Also, there is the possibility of masking or interference by the stronger low-altitude atmospheric perturbations.

Figure 13:
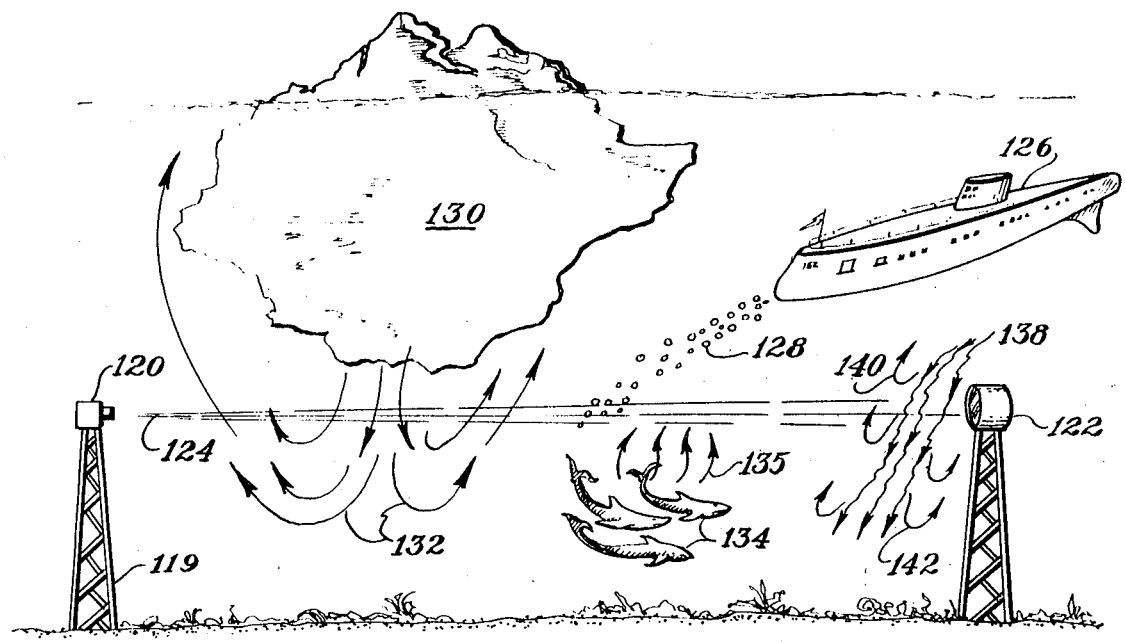
FIG. 13 is an undersea panorama showing a submarine and a detection station.

Ocean Seeing Conditions Monitor application, such as the following, should prove useful (see FIG. 13):

(A) Shown are a tower 119 with narrow-beam laser source 120 mounted atop, producing intense narrow laser beam 124, and tower with mounted receiver 122 containing a seeing conditions monitor specially designed to withstand the ocean environment.

(B) Several important perturbation examples are cited: Submarine 126 leaving heat and turbulence wake 128, iceberg 130 producing cold convective currents 132, passing sea life 134 leaving turbulence and heat wake 135, unusual cold or warm currents 138 which shift about, change in velocity and character of edge turbulence 140 and 142.

All of these transient or mobile perturbations occur against a background of normal perturbations present in the ocean due to wave and tidal action. My invention supplies a means for monitoring the ocean at selected locations (using towers or buoys or other well known means) by means of laser beam paths which are disturbed by passing perturbers and thereby afford means for recognizing their presence.

As employed in the claims the term "observatory" includes seeing, hearing, detection, or other energy-sensing capability.

What I claim as new and desire to secure by Letters Patent is:

1. Means for quantizing the effect of perturbations within a medium upon energy traveling through the medium comprising:
   (a) a source which sends energy into the medium;
   (b) a means for gathering the energy;
   (c) an array of sensing means;
   (d) means to focus a portion of the energy propagated through the medium upon said array;
   (e) means for computing one or more moment-related parameters of the distribution of said energy impinging upon said sensing means;
   (f) means for reading the signals from the individual elements of the array, or the results of any moment related computation.

2. The method of determining the instantaneous propagation quality of energy from a source through a medium comprising the step of measuring the deviation of the center-of-gravity of an image of the source transmitted through the medium.

3. The method of claim 2 including the further step of measuring the variance in image intensity.

4. The method of claim 2 wherein the deviation of the center-of-gravity is measured as a function of time.

5. The method of claim 3 wherein the deviation of the center-of-gravity of the image and the variance in image intensity is measured as a function of time.

6. Apparatus for detecting clear air turbulence in the earth's atmosphere comprising:
   (a) a satellite orbiting the earth;
   (b) an aircraft;
   (c) laser-beam-transmitting-means carried by said satellite and adapted to direct a laser beam toward the aircraft;
   (d) laser-beam-receiving-means carried by said aircraft;
   (e) means for imaging the received laser beam; and (f) means for determining the center-of-gravity of the image produced by the imaging means of step (e).

References Cited

UNITED STATES PATENTS

| | | | |
|---|---|---|---|
| 2,751,921 | 6/1956 | Baldwin et al. | 73—65 X |
| 3,135,957 | 6/1964 | Cunningham et al. | |
| 3,198,513 | 8/1965 | Farez | 73—65 X |
| 3,354,299 | 11/1967 | Feldman | 235—193.5 X |
| 3,393,307 | 7/1968 | Courtenay et al. | 235—194 X |
| 3,452,872 | 7/1969 | Canning | 73—147 XR |

OTHER REFERENCES

Stevens, Horman, and Dodd: The Determination of Atmospheric Transmissivity by Backscatter From a Pulsed-Light System, ASTIA Doc. No. 133,602, July 1957.

RALPH G. NILSON, Primary Examiner

CHARLES M. LEEDOM, Assistant Examiner

U.S. Cl. X.R.

235—193.5, 194; 73—65, 170